(No Model.)

G. M. ROSE.
BELTING.

No. 308,805. Patented Dec. 2, 1884.

WITNESSES:
W. C. Coolies
A. M. Best

INVENTOR
George M Rose
By Coburn & Thacher
ATTORNEY

UNITED STATES PATENT OFFICE.

GEORGE MATHEW ROSE, OF CHICAGO, ILLINOIS, ASSIGNOR OF ONE-HALF TO JAMES B. CULL, OF SAME PLACE.

BELTING.

SPECIFICATION forming part of Letters Patent No. 308,805, dated December 2, 1884.

Application filed January 7, 1884. (No model.)

*To all whom it may concern:*

Be it known that I, GEORGE M. ROSE, a subject of the Queen of Great Britain, residing at Chicago, in the county of Cook and State of Illinois, have invented a certain new and useful Improvement in Belts, which is fully set forth in the following specification, reference being had to the accompanying drawings, in which—

Figure 1:
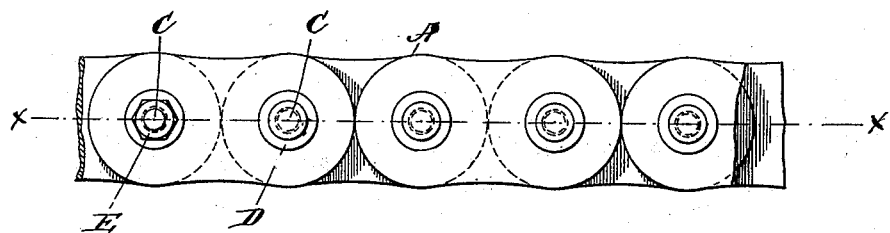
Figure 2:
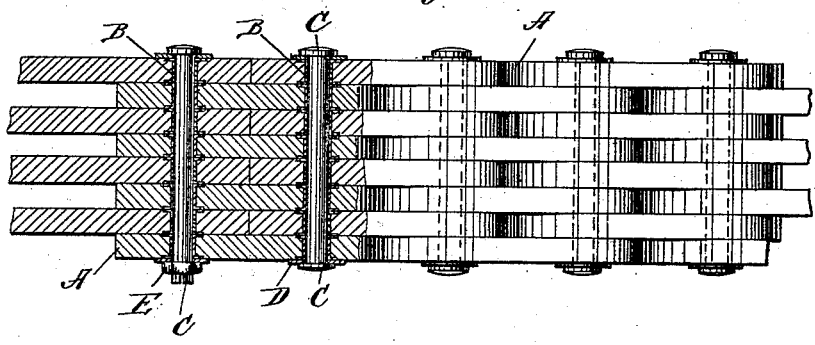
Figure 3:

Figure 1 represents an edge view of a section of my improved belt; Fig. 2, a top or plan view, one portion cut in section on line X X, Fig. 1; and Fig. 3 represents a section of one of the washers, the full lines representing its shape when inserted, with dotted lines representing the end turned down after being inserted.

My invention relates to belts adapted to transmit power to run machinery, and particularly to that class of belts which are composed of short strips or links of leather or equivalent material; and it consists in applying a bushing or lining to the holes in the links, to prevent the destructive wear of the connecting-pins upon the leather.

In the accompanying drawings, A represents pieces of leather, rawhide, or other equivalent material cut with rounded ends, each piece being punched with two holes, one near each end, adapted to receive two bolts, and said pieces are so placed that one piece passes by the joint of the two adjacent pieces, as clearly shown in Fig. 2. These pieces are placed side by side, and so that the thicknesses of all the pieces that are placed side by side constitute the width of the belt, and the belt may be made as long as desired by continuing the pieces arranged as clearly shown in the drawings. The edges of the pieces A are cut slightly concave, as shown, to fit the pulleys over which they run. If, however, it is intended to use the belt upon large pulleys or drums, the edges may be straight.

B is a washer or eyelet made of thin sheet metal, and there is one of these washers or eyelets placed in each hole punched in the pieces A. When the eyelets are placed in said holes, the end that passes through the hole is then stamped down, as shown by the dotted lines in Fig. 3, forming a head to keep said eyelets in place. When the pieces A are placed in position, there is a row of these eyelets opposite each other, making an opening through the belt, as shown in Fig. 2, into which the bolt C is placed to hold the pieces A together. The bolts C are made with a head on one end, and when they are placed in position they are secured by heading the other end down upon a washer, D, or they may be held by a nut, E, shown on one of the bolts in Fig. 2. When these bolts are in position, each bolt passes through each of the pieces A, that are placed side by side, and the circular ends of one row of pieces are opposite the center of the pieces in the adjacent row of pieces, so that they break joints, as clearly shown in the drawings. The bolts form pivots on which these pieces are flexible, and the ends of the pieces A where the ends come together are made rounding, so as to allow them to vibrate slightly upon the bolts C as they pass over a drum or pulley on which the belt runs. The edges of all these pieces run upon the drum or pulley, giving the belts great durability. The washers or eyelets B are placed in the holes made in the pieces A, to keep the holes always in shape, and prevent the leather or other material of which these pieces A are made from wearing on the bolts C.

Having thus fully described my invention, what I claim, and desire to secure by Letters Patent, is—

The combination, in a belt, of the pieces A, washers B, and bolts C, substantially as specified and shown.

GEORGE MATHEW ROSE.

Witnesses:
  A. M. BEST,
  H. D. HOLLISTER.